No. 607,806. Patented July 19, 1898.
F. W. SMITH.
CORN COOKING AND CAN FILLING MACHINE.
(Application filed Apr. 21, 1897.)
(No Model.) 2 Sheets—Sheet 1.
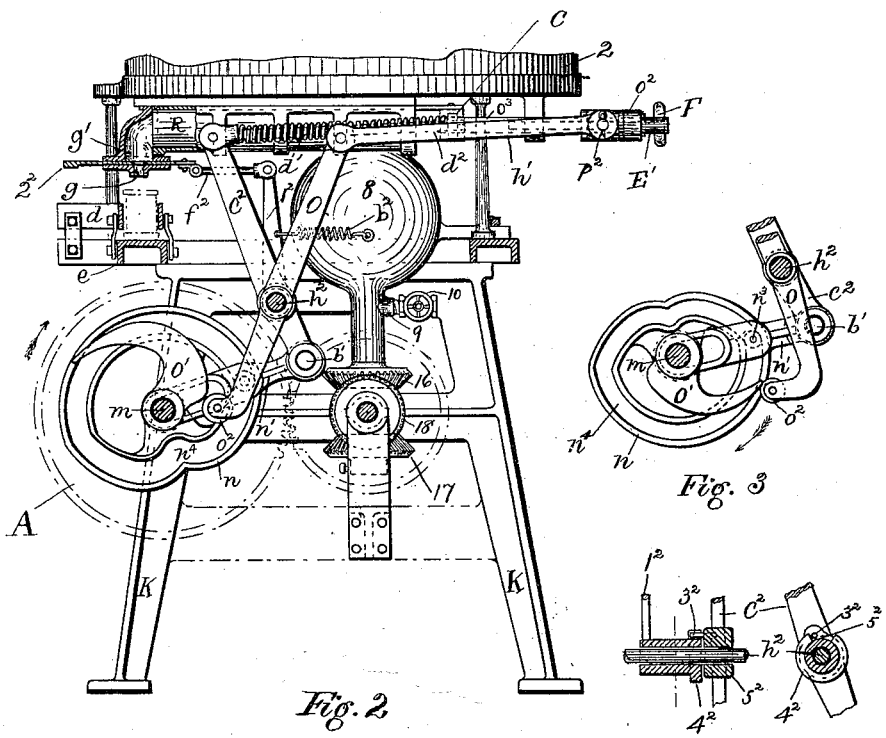
Fig. 2
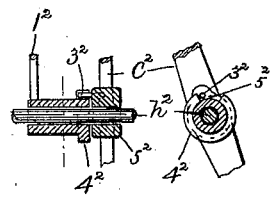
Fig. 3
Fig. 4
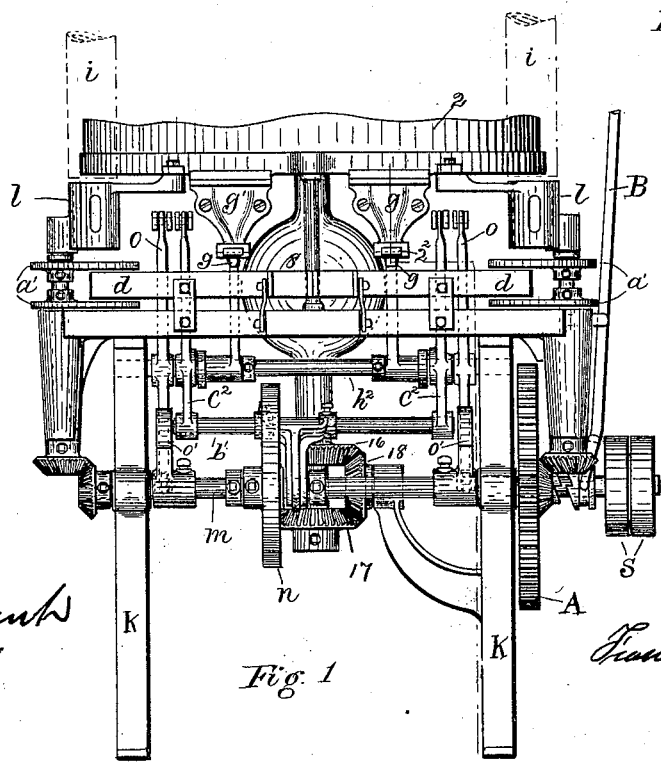
Fig. 1
Witnesses: Inventor:
F. J. Conant Frank W. Smith

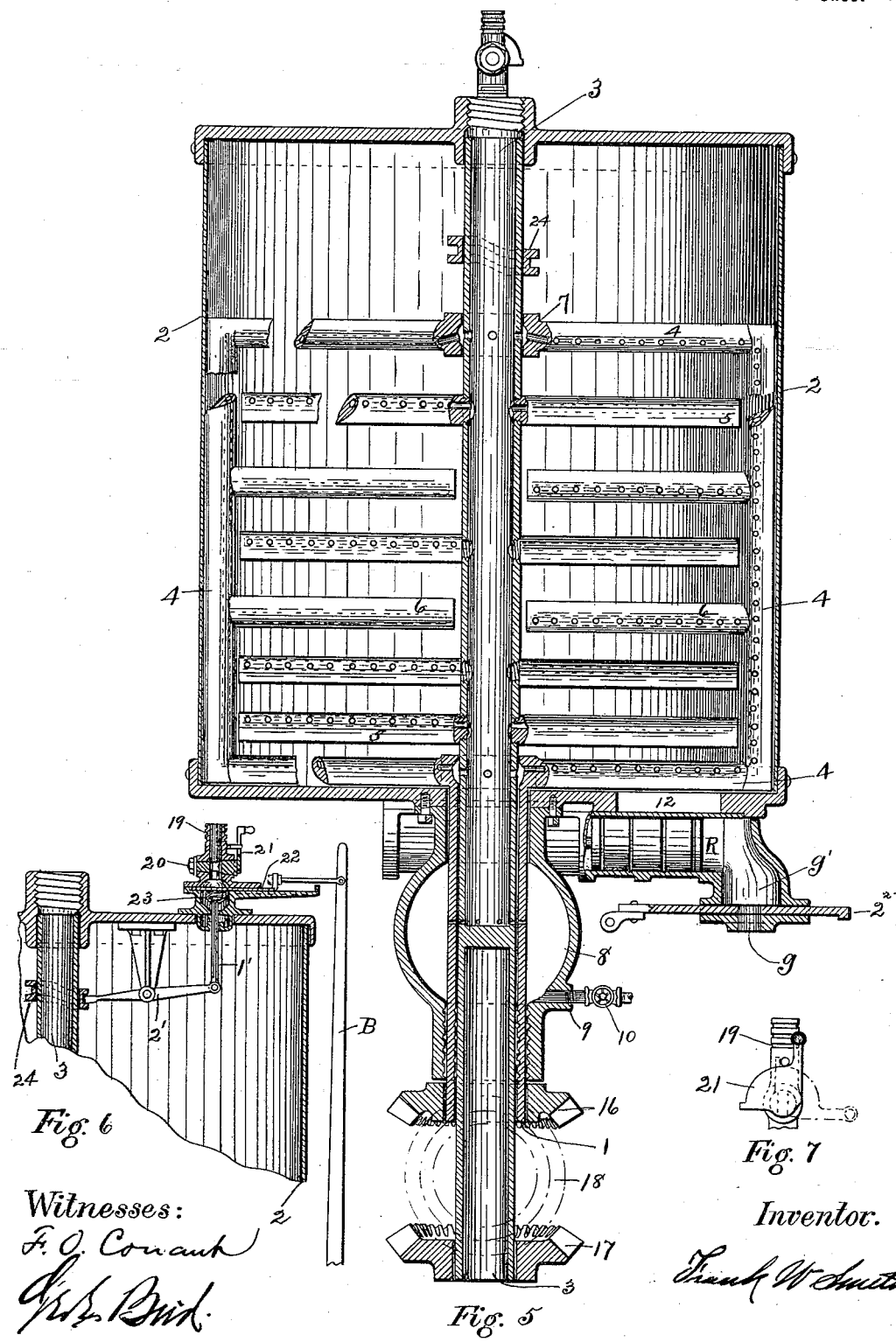

UNITED STATES PATENT OFFICE.

FRANK W. SMITH, OF PORTLAND, MAINE, ASSIGNOR OF ONE-HALF TO FREDERICK O. CONANT, OF SAME PLACE.

CORN-COOKING AND CAN-FILLING MACHINE.

SPECIFICATION forming part of Letters Patent No. 607,806, dated July 19, 1898.

Application filed April 21, 1897. Serial No. 633,145. (No model.)

*To all whom it may concern:*

Be it known that I, FRANK W. SMITH, a citizen of the United States, residing at Portland, in the county of Cumberland and State of Maine, have invented certain new and useful Improvements in Corn-Cooking and Can-Filling Machines; and I do hereby declare that the following is a full, clear, and exact description of the invention, which will enable others skilled in the art to which it appertains to make and use the same.

My invention relates to a combined cooking and filling machine for cooking corn and similar substances and filling cans therewith.

The invention in the filling-machine consists in certain improvements upon the can-filling machine shown and described in Letters Patent No. 360,541, granted to Henry R. Stickney, 2d, April 5, 1887, and involves an improvement in the nozzle and in the mechanism operating the valve at the nozzle and the motion of the plunger discharging the contents of the filling-chamber, whereby the motion of the discharging-piston is so regulated that the contents of the discharge-chamber are forced into the can more deliberately and the machine at the same time rendered more effective and of greater capacity.

The improvements in the cooking-machine consist in a novel combination, with the cooking vessel, of the arms by which the substances to be cooked are agitated during the process and a device connected with the cooking-chamber by means of which an ascertained amount of water, syrup, or other liquid may be admitted to the cooking-chamber at regular intervals of time.

In the drawings, Figure 1 is a front elevation of the rear portion of the can-filler, showing the lower portion of the cooking-chamber. Fig. 2 is a side elevation of the same. Fig. 3 is a detail of the cams; Fig. 4 is a detail of the means for operating the nozzle-valve. Fig. 5 is a transverse longitudinal section of the cooking-chamber. Fig. 6 is a detail showing a portion of the top of the cooking-chamber and the valve for the admission of liquids, and Fig. 7 is a detail showing the gage of the valve.

The cooking-chamber 2 is shown in Fig. 5. It is a closed vessel, steam-tight, with the exception of an opening at the top for the admission of the substance to be cooked. As I have constructed it it consists of a box cylindrical in form supported upon the can-filler. Centrally located within the chamber 2 and extending downward through the bottom is a separator 3, which is a revolving steam-pipe or hollow shaft, hereinafter referred to as a "separator." This is journaled in the top or cover of the cooking-chamber and passes downward through the bottom of the chamber, as shown in Fig. 1 and as more particularly described hereinafter. Connected with the separator are hollow arms 5 5, which are perforated upon one side, as shown in Fig. 5, the interior of the arms communicating by a passage with the interior of the separator. The separator 3 is provided with a sleeve 1, which surrounds the separator for a short distance above and within the bottom of the cooking-chamber 2 and extends some distance below, as shown in Fig. 5. To this sleeve 1 within the chamber 2 is rigidly attached a rectangular hollow frame 4, which lies upon the bottom of the chamber 2 and fits closely to the sides. The top of the frame terminates in a sleeve 7, which closely fits around the separator. The frame is provided with hollow arms 6 6, which are, as also is the frame 4, provided with apertures upon one side. The upper part of the sleeve 1 within the chamber, as also the sleeve 7, are provided with apertures communicating with the interior of the frame 4, which register with the apertures in the separator 3. Both the sleeve 1 and the separator 3 are provided with beveled gears 16 and 17, respectively, which intermatch with a beveled gear 18 upon the shaft operating the cooking-machine. Beneath the bottom of the machine is a drum 8, provided with an opening near the bottom 9, which is controlled by a valve 10. That portion of the separator 3 included within the drum 8 is provided with a diaphragm 11, above which both the separator 3 and the sleeve 1 are perforated and in such manner that as they revolve the apertures will register.

At the bottom of the cooking-chamber is an opening 12, connecting with the discharge-chamber, from which the cans are filled. The discharge-chamber R is shown in Fig. 1 and is semicircular in form, terminating in a nozzle $g$, which is regulated by a sliding valve $2^2$.

Devices for adding either syrup or other liquids to the contents of the cooking-chamber have consisted heretofore either in a valve attached to or suspended above the cooking-chamber, by means of which a constant stream of the fluid was admitted to the chamber, the size of the stream being graduated by a valve or in a pump, by means of which a certain amount of liquid has been injected into the charge-chamber or into the can as or just before the can was filled.

The device for the admission of syrup, &c., to the cooking-chamber may be described as follows:

19 is a tube extending upward from the cover of the chamber and communicating at the lower end with the interior of the latter. 20 is a rotary valve provided with a segmental dial 21. Below the valve 20 is a sliding valve 22, which is connected with the shipping-lever B. Below the valve 22 is a valve 23, mounted on the rod $1'$, the lower end of which is pivoted to the lever $2'$, which is pivoted to a support depending from the top of the chamber 2. The other end of the lever $2'$ is inserted in the path of the cam 24, which is rigidly attached to the upper part of the separator 3.

The operation of the cooker constructed as shown is readily seen. Steam is supplied to the separator 3 by means of a pipe entering the cover above the top of the separator. From the separator the steam enters the arms 5 5 and through the sleeves 1 and 7, the frame 4, and its arms 6 6. By rotation of the gears 16 and 17 the frame 4 is rotated in one direction, while the arms 5 5 of the separator move in the other or opposite direction, thus continually agitating and thoroughly mixing the corn or other substances which from time to time or continuously are introduced into the chamber through an opening in the cover. Steam is also supplied to the mass by the steam escaping from the rear of the arms and frame as they rotate. By means of the device at the top of the cooker the desired quantity of syrup or other liquid may be introduced into the cooker during the full operation of the cooker, the size of the stream being regulated by the valve 20, (the dial 21 indicating the required position,) while the revolution of the separator controls the frequency of the admission. The syrup or other substance thus admitted is thoroughly mixed and cooked with the corn or other substance treated. The continuance of the admission of the syrup depends on the operation of the machine, the valve 22, connected with the shipping-lever, effectually stopping the flow when pushed inward by the lever. The rotation of the arms and frame thoroughly mixes and agitates the contents of the chamber until thoroughly cooked, when the can-filling process commences, and as the contents pass out into the charge-chamber other material is added through the top, making the process continuous.

The nozzle shown in Letters Patent of Stickney, above referred to, is nearly of the diameter of the opening of the can and a short distance above it. In operation it was found that part of the substance filled into the can was thrown out by the force by which it was impelled. This nozzle I have contracted in interior diameter, at the same time making the diameter less at the lower end than above, and have provided it with a slide-valve. This change in the nozzle rendered necessary a change in the mechanism for filling the can—viz., the means controlling the movement of the slide between the charge-chamber and the cooker and those operating the plunger in the charge-chamber.

The nozzle $g$ is shown in Fig. 2 and depends from a quarter-bend $g'$, connected with the end of the charge-chamber R. The interior diameter of the nozzle $g$ is less than the opening of the can by about one-half inch. Between the nozzle $g$ and the quarter-bend $g'$ is the slide $2^2$, which is connected by means of a connecting-rod $f^2$ with a lever $1^2$, which is pivoted on the shaft $h^2$. This lever is also connected by a spring $b^2$ with any standing part of the frame or machine. In Fig. 4 is a detail showing the lower part of the lever $1^2$. The lower part of this lever is provided with a sleeve on the shaft $h^2$, having a flange $4^2$, which has an opening in its upper surface, as shown in Fig. 4, into which opening projects a pin $3^2$, which is fixed in the side of the hub $5^2$.

The mechanism operating the slide C between the charge-chamber R and the hopper or cooker 2 consists of rods $d'$, surrounded by spiral springs $d^2$, levers $C^2$, connected at the upper end to the rod $d'$ and pivoted on the shaft $h^2$, while the lower end is connected pivotally with the shaft $b'$, which latter also carries the link $n'$, the bifurcation of which surrounds the shaft $m$, and a path-cam $n$, which receives the roller $n^3$ on the link $n'$. I modify the path $n^4$ of the cam $n$, as shown in Figs. 2 and 3. One-half of the path is concentric, while the remainder is divided into two equal parts, both of which are eccentric, but within the circumference of the concentric portion. The path-cam $n$ is thus adapted in one revolution to impart to the link $n'$, and consequently to the levers $C^2$, first a motion toward the shaft $m$, (being one-quarter of the revolution,) thus opening the slide C, then a motion from the shaft $m$, thus closing the slide C, and then an idle motion for the remaining half of the revolution.

The mechanism operating the plunger of the charge-chamber consists of the guides $O^3$, yoke $p^2$, and rods $h'$, connected with levers O, which are pivoted upon the shaft $h^2$, while the lower ends are provided in bifurcations with the rollers or trucks $O^2$ and the cam $O'$ on the shaft $m$. I modify the cam $O'$ by swelling the cam outward abruptly for a short distance near the hub and then gradually curving it outward to a point about equidistant from the center with the exterior circumference of the concentric portion of the cam $n$, this portion of the eccentricity of the cam O' requiring for its completion an angle of about one hundred and thirty degrees, while the cam used and shown in Patent No. 360,541 requires but about ninety degrees for its completion. The result is that the plunger from the very first part of its course is rapidly driven on, compressing the contents of the charge-chamber, (which has now been cut off from the cooker 2,) and then the motion becomes more and more gradual, the slowest part of the action being at the end of the stroke. The contents of the charge-chamber are therefore very gradually introduced into the can and loss of material prevented and the cleanliness of the can and the machine preserved.

The slide-valve $2^2$, which closes the nozzle $g$, is operated by the lever $C^2$ through the pin $3^2$, which, coming into contact with the flange of the lever $1^2$ as the lever $C^2$ moves forward to close the slide of the charge-chamber R, carries the lever $1^2$ with it, thus opening the nozzle. As the lever $C^2$ returns to open the slide of the charge-chamber the valve $2^2$ is drawn by the spring $b^2$, thus closing the nozzle. In case the spring $b^2$ fails to act the pin $3^2$ later comes in contact with the other side of the recess in the flange $4^2$ and closes the nozzle by forcing the lever $1^2$ backward.

It will be observed that the arms connected with the separator in the cooking-chamber, as well as the frame and its arms, are rounded upon one side and drawn to an edge upon the other side. They are also arranged so that the rounded surfaces will be in the rear as they rotate, while the arms on the drum and frame are arranged so that the sharp edge at the front will be at the top and the bottom alternately. The substance in the cooker is first pressed down, as where the edge is upon the top of the front of the arm, and is then elevated, as where the sharp edge is upon the lower part of the front of the arm. This arrangement contributes to the more thoroughly mixing of the substance in the cooker.

What I claim is—

1. In a cooking vessel having a separator with arms attached thereto, the combination of sleeves around said separator, a frame rigidly connected with said sleeves, arms connected with said frame and means for rotating said separator and sleeves in opposite directions, all of said sleeves and said frame being round upon one side and brought to an edge on the other and so arranged that when rotated the sharp side of the frame and said arms will be in front and uppermost on the frame and its arms and downward on the arms of the separator, substantially as described.

2. In a cooking vessel having a separator with arms attached thereto, the combination of sleeves around said separator, a frame rigidly connected with said sleeves, arms connected with said frame said arms, sleeves and frame being hollow for the purpose of admitting steam or heat and means for rotating said separator and sleeves in opposite directions, all of said sleeves and said frame being round upon one side and brought to an edge on the other and so arranged that when rotated the sharp side of the frame and said arms will be in front and uppermost on the frame and its arms and downward on the arms of the separator, substantially as described.

3. In combination with a cooking vessel having a revolving separator or drum, a tube or passage opening into said vessel, a valve in the upper part of said passage by which the size of the passage may be increased or diminished, a sliding valve by which said passage may be entirely closed and a valve, beneath said last-named valve operated by a cam upon said separator, substantially as described.

4. In combination with a cooking vessel having a revolving shaft, a tube or passage opening into said vessel, a valve in the upper part of said passage by which the size thereof may be contracted, a sliding valve by which said passage may be entirely closed and a valve, beneath said last-named valve, operated by the cam upon the said shaft, substantially as described.

5. In a machine for cooking corn and other substances having a cooking-chamber, a passage opening into said chamber, a valve whereby the size of said passage may be contracted, a sliding valve connected with the shipping-lever of said machine and a valve beneath the last-named valve operated by a cam, substantially as described.

6. In a machine for filling cans, the combination of a hopper or cooker, the lower end of which opens into a charge-chamber, a filling-nozzle leading from the latter, a cut-off plate intermittently interposed between said hopper and said charge-chamber, a plunger in said charge-chamber, mechanism for withdrawing said cut-off plate and immediately forcing it in and then allowing it to remain for a time equal to that occupied in withdrawing and inserting it, a mechanism for forcing in the plunger while said cut-off plate is interposed, the motion imparted to said plunger being at first rapid and then becoming gradually slower, said mechanisms then withdrawing the cut-off plate and plunger, substantially as described.

In testimony that I claim the foregoing as my invention I have hereunto set my hand this 19th day of April, A. D. 1897.

FRANK W. SMITH.

In presence of—
F. O. CONANT,
GEO. E. BIRD.